United States Patent [19]

Sobotta

[11] 4,243,922

[45] Jan. 6, 1981

[54] AIRCRAFT CONTROL SYSTEM

[75] Inventor: Werner Sobotta, Brinkum, Fed. Rep. of Germany

[73] Assignee: Vereinigte Flugtechnische Werke-Fokker GmbH, Bremen, Fed. Rep. of Germany

[21] Appl. No.: 937,513

[22] Filed: Aug. 28, 1978

Related U.S. Application Data

[63] Continuation of Ser. No. 314,764, Dec. 13, 1972, abandoned.

[30] Foreign Application Priority Data

Dec. 31, 1971 [DE] Fed. Rep. of Germany ....... 2165894

[51] Int. Cl.³ .............................................. G05B 13/00
[52] U.S. Cl. .................................................... 318/561
[58] Field of Search ......................................... 318/561

[56] References Cited

U.S. PATENT DOCUMENTS

| 3,001,176 | 9/1961 | Shih | 318/561 X |
| 3,109,970 | 11/1963 | Smyth | 318/561 |
| 3,216,676 | 11/1965 | Brolon | 244/77 |
| 3,283,229 | 11/1966 | Lindahl | 318/561 |

Primary Examiner—B. Dobeck
Attorney, Agent, or Firm—Smyth, Pavitt, Siegemund, Jones & Martella

[57] ABSTRACT

A manual control system for aircraft with feedback is improved in that the error signal amplifier gain varies also in response to the error signal. The gain is normally (zero error signal) quite low, well below the critical gain for high speed operation of the craft. The gain is increased with the error signal taking into account that the craft's reaction is lower at low speeds, and that error signals are usually lower at high speeds, particularly because stick command outputs are lower and craft's reaction is faster.

3 Claims, 1 Drawing Figure

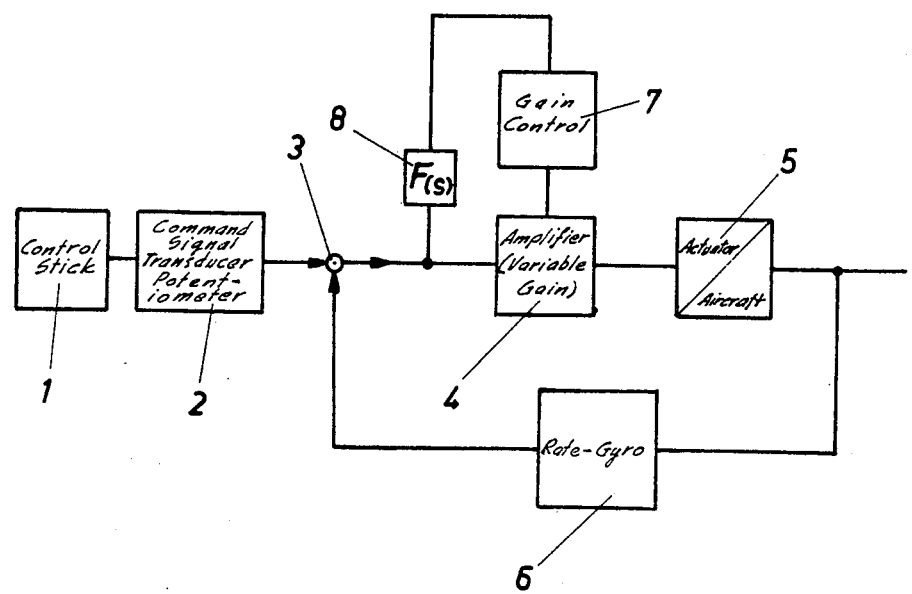

AIRCRAFT CONTROL SYSTEM

This is a continuation of application Ser. No. 314,764, filed Dec. 13, 1972 abandoned.

BACKGROUND OF THE INVENTION

The present invention relates to improvements of apparatus for feedback control and stabilizing of an aircraft. Here particularly, the invention relates to feedback control systems in aircraft with manual command input, e.g. via the control stick.

Automatic flight controllers in aircraft must be constructed to meet a wide variety of flight conditions. For example, present day high-performance aircraft must have controllers which cover a very large speed range. For example, the controller may have to impart STOL properties upon the craft, but will operate under supersonic conditions a little later. Also, sometimes the craft will cruise at very low altitudes; at other times, the craft will loiter at great heights. Naturally, it is close to impossible to use operating parameters in the flight controller that provides optimum operation over the entire range.

Linear operating controllers with fixed parameters are practically unusable in modern day aircraft. Using plural controllers for different speed ranges changes little, and the change over from one to the other is per se a complication. It is known to render the controller rather independent from specific parameters by using suitable networks of, i.e. nonlinear circuit elements. Nevertheless, the situation remains that a craft reacts relatively slowly at low speeds so that the controller must provide for high gain in the error signal-actuator network. However, such high gain will immediately result in problems as to stability when the craft moves at high speeds, such as supersonic speeds. This is one of the reasons which render linear controllers unsuitable for an aircraft that operates over a wide speed range, even if the network tends to render the operator response independent from the parameters, such as gain in the controller amplifier.

Linear controllers have been replaced by controllers in which the parameters of the automatic feedback system are made dependent, e.g. upon speed. For example, dynamic pressure is measured and introduced as parameter into the controller to vary, e.g. amplifier gain. However, introduction of such additional parameter renders the controller even more complicated. It has to be observed that for reasons of safety the principle of redundancy is used extensively. The controller system includes plural, parallely but independently operating controllers. Accordingly, dynamic pressure transducers are used also in the plurality, including plural function generators, signal multipliers, etc., for introducing dynamic pressure into the several controllers as additional variable. Such multiple controllers should, of course, run parallel in the true sense; each should produce the same actuator output for the same operating (external) conditions and commands. The more variables that are used, the more difficult it is to ensure such parallel operations with consistently similar results. On the other hand, introducing a new parameter renders the system inherently less reliable so that the redundancy may even be required to be increased. It can readily be seen, that this approach of introducing another variable snowballs complications and expenditures.

Another approach has been taken in the so-called self-adapting controller. The controller tracks internally system operation and calculates automatically optimum parameters which are then adjusted accordingly and by automatic internal operation. Such a system avoids the complications resulting from introducing additional external variables, but expenditure is considerable, because the principle of redundancy must be maintained. However, reliability of operation has not yet been obtained to the desired and needed degree.

Electronic automatic control systems have become known (see German printed patent application No. 1,563,883) wherein the control parameters are varied by the error signal. Particularly, input and/or feedback impedance are varied by the error signal. This method has the advantage generally that the response and the period of time needed to reduce the error signal, e.g. by a fixed percentage, depends only on the rate of change of measured and/or command input values. It is believed, that this approach is more promising when used in flight controllers for optimizing their operation.

SUMMARY OF THE INVENTION

It is an object of the present invention to avoid the difficulties above and to provide a novel approach for parameter adjustment in aircraft control systems.

In accordance with the preferred embodiment of the invention, it is suggested to adjust the parameters such as amplifier gain to relatively low, non-critical values as far as stability of operation at high speeds is concerned, and that the error signal (aside from its being used in the usual manner) is fed to a nonlinear operating stage which increases the parameters accordingly. As a consequence, large commands and/or large directional deviations will be effective as large error signals at relatively high gain. Those large values, however, occur only at low speeds. As the reaction of the craft is slower at slow speeds, the needed high gain at lower speeds is available through a large error signal. Additionally to control a certain load factor at high speed smaller stick input is necessary than for low speed, so that the automatic feedback system is made to operate at low gain.

The stability can be enhanced by introducing frequency dependency into gain control as made dependent on the error signal. This way, there is further matching of craft response at different speeds.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

The FIGURE is a block diagram for a flight control system with automatic feedback and improved in accordance with the preferred embodiment of the invention.

Proceeding now to the detailed description of the drawings, block 1 is a schematic representation of the pilot's stick operating a potentiometer 2 as a command signal generator. A comparator 3 (negative summing point) receives this command signal as well as a signal representing a controlled variable. The controlled variable is an angular rate montitored by a rate gyro 6, which produces a representative signal accordingly.

Therefore, summing point-comparator 3 produces an error signal.

The error signal is fed to a variable gain amplifier 4 (or amplifier system with plural stages). The output of the amplifier 4 controls the corresponding actuator in the aircraft 5 whose response is monitored by gyro 6 so as to close the loop.

In addition, the error signal produced by comparator 3 is fed to a impedance network 8 having a frequency dependent transfer function to modify the input accordingly. The output of stage 8 controls a circuit 7 which, under proper impedance matching conditions, varies the gain of amplifier 4.

The network 8-7 together is nonlinear for reasons of the stated frequency dependency of device 8. However, another type of nonlinearity may be involved in the gain control of amplifier by the error signal. The gain may rapidly rise for increasing error signals.

The entire device operates as follows: The gain parameter in amplifier 4 is normally adjusted and held at a relatively low value for low or zero error signals so that in case of high speed, there is no problem as to stability of operation. In case of a large command input (control stick 1-potentiometer 2) or in case of a large deviation from the course as siganaled by gyro 6, there will be a significant error signal and the gain will be increased accordingly so that a strong corrective signal is produced. However, the gain control is modified by frequency response of stage 8. Therefore, if the change in error signal is a sudden one, the error signal changes as so transmitted are rich in high-frequency components, and the amplification will, therefore, be less than in case of a slower change.

Nevertheless, the high gain as resulting from strong commands of significant deviations from the desired angular rate are effective at considerable magnitudes during low speed flights. This is enhanced by the fact that the rates of changes of these variables are lower at lower speed enhancing the corrective measures taken by the controller through operation of device 8. At high speeds, the pilot will introduce smaller commands, so that the gain is not excessively increased. Accordingly, the corrective effect is slower at high speeds because the reaction of the craft is faster at high speeds than at low speeds, so that the gain factor will not be remarkable increased.

It should be noted further, that the principle of the invention has been explained on basis of a straight forward example. The control amplifier 4 may actually be comprised of a system in which the error signal is amplified, but also its integral and/or its time derivative is formed, amplified and summed. Each component of the resulting composite signal is separately amplified so that the relative proportion of the respective component in the composite signal ccan be varied by gain control. Accordingly, there may be provided plural networks 8-7, each controlling separately the gain for the error signal, its integral or its derivative. These several gains are additional parameters that can be controlled by the error signal in accordance with the invention.

The invention control system is primarily characterized by simplicity. Neither is it necessary to introduce dynamic pressure, nor is the controller adaptive in form of internal calculation. The gain control of the principle amplification portion in the controller, as operated in dependence upon error signal amplitude and frequency, using low gain for error signal zero, ensures that the craft remains stable and indirectly considers differences in speeds, without necessitating the direct introduction of speed as variable. The controller is also simpler and more reliable and from that point of view, is quite comparable to linear controllers with constant parameters.

The invention is not limited to the embodiments described above but all changes and modifications thereof not constituting departures from the spirit and scope of the invention are intended to be included.

I claim:

1. Apparatus for controlling and stabilizing an aircraft using a controller which is responsive to signals introduced into the controller as command signals, the controller including feedback means which are responsive to reaction of the aircraft to any changes by and of an actuator means, the feedback means providing a particular signal representative as such reaction, the controller including means for comparing the command signal as provided in any instant with the particular signal then provided, for forming an error signal, the controller includes additionally amplifier means for amplifying the error signal, the output of the amplifier means operating the actuator means in the craft in response to comparison of the command signals with the reaction-responsive signals, the improvement comprising:

an adjusting and control circuit connected to be additionally responsive to the instanteous, un-integrated error signal as formed and applied to the amplifier means for amplification but not yet modified by the amplifier means, for changing parameters in the controller, said adjusting and control circuit being connected to said amplifier means for consistently increasing or decreasing the gain of amplification of the amplifier means non-linearly with the error signal as formed, so that the gain is consistently low for zero and small error signals as formed and applied to the amplifier means for amplification and relatively high for relatively large instantaneous error signals as formed and so applied, so that the gain varies with the instantaneous error signal as formed and applied to the amplifier means for amplification accordingly.

2. Apparatus as in claim 1, additional circuit means included in said circuit and having frequency-dependent transfer function to cause a further optimization of the aircraft's dynamic behaviour.

3. Apparatus for controlling and stabilizing an aircraft using a controller which is responsive to signals introduced into the controller as command signals, the controller including feedback means which are responsive to reaction of the aircraft to any changes by and of an actuator means, the feedback means providing a particular signal representative as such reaction, the controller including means for comparing the command signal as provided in any instant with the particular signal then provided, for forming an error signal, the controller includes additionally amplifier means for amplifying the error signal, the output of the amplifier means operating the actuator means in the craft in response to comparison of the command signals with the reaction-responsive signals, the improvement comprising:

an adjusting and control circuit connected to be additionally responsive to the unintegrated error signal as formed and applied to the amplifier means for amplification but not yet modified by the amplifier means, for changing parameters in the controller, said adjusting and control circuit being connected to said amplifier means for consistently increasing or decreasing the gain of amplification of the amplifier means nonlinearly with the error signal as formed, so that the gain is consistently low for zero and small error signals as formed and applied to the amplifier means for amplification and relatively high for relatively large error signals as formed and so applied, so that the gain varies with the error signal as formed and applied to the amplifier means for amplification accordingly.

* * * * *